United States Patent [19]
Liao et al.

[11] Patent Number: 5,939,497
[45] Date of Patent: Aug. 17, 1999

[54] POLYETHERIMIDE RESIN/POLYESTER RESIN BLENDS

[75] Inventors: Jun Liao, Evansville, Ind.; Darryl Nazareth, Randolph, N.J.; Yimin Jin, Newburgh, Ind.

[73] Assignee: General Electric Company, Pittsfield, Mass.

[21] Appl. No.: 08/926,268

[22] Filed: Sep. 5, 1997

[51] Int. Cl.⁶ .............................. C08L 79/08; C08L 67/02
[52] U.S. Cl. ............................................ 525/425; 525/444
[58] Field of Search ...................... 525/425, 444

[56] References Cited

U.S. PATENT DOCUMENTS

| | | |
|---|---|---|
| 3,803,085 | 4/1974 | Takehoshi et al. . |
| 3,814,869 | 6/1974 | DeLuca . |
| 3,847,867 | 11/1974 | Heath et al. . |
| 3,850,885 | 11/1974 | Takekoshi et al. . |
| 3,852,242 | 12/1974 | White . |
| 3,855,178 | 12/1974 | White et al. . |
| 3,905,942 | 9/1975 | Takekoshi et al. . |
| 3,972,902 | 8/1976 | Heath et al. . |
| 3,983,093 | 9/1976 | Williams, III et al. . |
| 4,455,410 | 6/1984 | Giles, Jr. . |
| 5,439,987 | 8/1995 | Scott et al. . |
| 5,648,433 | 7/1997 | Scott .................................... 525/425 |

OTHER PUBLICATIONS

Kirk–Othmer Encyclopedia of Chemical Technology, Fourth Edition, vol. 19, pp. 609–653, John Wiley & Sons (1996).

*Primary Examiner*—Patricia A. Short

[57] ABSTRACT

Visually clear thermoplastic resin compositions include a polyetherimide resin, a first polyester resin and a second polyester resin, wherein from 50 to 100 mole percent of the structural units of the first polyester resin include an alicyclic hydrocarbon radical as the diol residue of the structural unit, and wherein less than 50 mole percent of the structural units of the second polyester include an alicyclic hydrocarbon radical as the diol residue of the structural unit, exhibit resistance to elevated temperature and improved impact properties.

16 Claims, No Drawings

POLYETHERIMIDE RESIN/POLYESTER RESIN BLENDS

FIELD OF THE INVENTION

The present invention relates to thermoplastic resin blends, more specifically to certain visually clear blends of polyetherimide resins and polyester resins.

BACKGROUND

Blends of polyetherimide resins and polyester resins derived predominantly from cyclohexane dimethanol and a carbocyclic dicarboxylic acid, such as, for example, a poly(cyclohexane-dimethanol terephthalate) resin that provide improved impact strength are disclosed in U.S. Pat. No. 5,439,987. Blends of polyetherimide resins and copolyesters of terephthalic acid and/or isoterephthalic acid, 1,4-cyclohexanedimethanol and ethylene glycol, that is, certain poly (cyclohexane-1,4-dimethylene-co-ethylene terephthalate) resins that are said to exhibit a high flexural modulus are disclosed in U.S. Pat. No. 5,439,987.

Polyetherimide blends that exhibit visual clarity, resistance to elevated temperature and further improvements in impact resistance are desired.

SUMMARY OF THE INVENTION

In a first embodiment, the present invention is directed to a visually clear thermoplastic resin composition, comprising a mixture, based on 100 parts by weight ("pbw") of the thermoplastic resin composition, of:

(a) from 50 to 96 pbw of a polyetherimide resin, (b) from 2 to 35 pbw of a first polyester resin comprising recurring structural units, wherein each structural unit comprises a diol residue and a diacid residue and wherein from 50 to 100 mole percent ("mol %") of the structural units of the first polyester resin comprise a divalent alicyclic hydrocarbon radical as the diol residue of the structural unit, said first polyester resin being present in an amount of:

(i) from 2 to 15 pbw, if from 90 to 100 mol % of the structural units of the first polyester resin comprise a divalent alicyclic hydrocarbon radical as the diol residue of the structural unit, or (ii) from 2 to 35 pbw, if from 50 mol % to less than 90 mol % of the structural units of the first polyester resin comprise a divalent alicyclic hydrocarbon radical as the diol residue of the structural unit, and (c) from 2 to 48 pbw of a second polyester comprising recurring structural units, wherein each structural unit comprises a diol residue and a diacid residue and wherein from 0 to less than 50 mol % of the structural units of the second polyester resin comprise a divalent alicyclic hydrocarbon radical as the a diol residue of the structural unit, provided that, if the second polyester comprises structural units wherein the diol residue is a dimethylene radical, then the second polyester does not comprise any structural units wherein the diacid residue is a 2,6-naphthalene dicarboxylate radical and further provided that the polyetherimide resin must be present in an amount greater than 65 pbw if less than or equal to 60 mol % of the structural units of the first polyester comprise a divalent alicyclic radical as the a diol residue of the structural unit.

In a preferred embodiment, the present invention is directed to a thermoplastic resin composition, comprising a mixture, based on 100 pbw of the thermoplastic resin composition, of:

(a) from 50 parts by weight to 96 parts by weight of a polyetherimide resin comprising structural units of the formula:

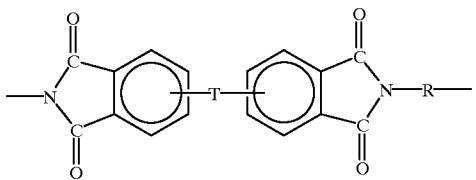

wherein each R is independently paraphenylene or metaphenylene and T is a divalent radical of the formula:

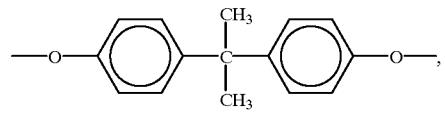

(b) from 2 to 15 pbw of a poly(cyclohexane-1,4-dimethylene terephthalate) resin, and (c) from 2 to 48 pbw of one or more second polyester resins selected from copolyester resins, wherein said copolyester resins each comprise recurring structural units, each structural unit comprises a diol residue and a diacid residue, each of the structural units comprises a 1,4-phenylene or 1,3-phenylene radical as the diacid residue of the structural unit and from 50 to 90 mol % of the structural units comprise a dimethylene radical as the diol residue of the unit and from 10 to 50 mol % of the structural units comprise a cyclohexane-1,4-dimethylene radical as the diol residue of the structural unit, and poly(ethylene terephthalate) resins.

In an alternative embodiment, the present invention is directed to a visually clear thermoplastic resin composition, comprising a mixture, based on 100 pbw of the thermoplastic resin composition, of:

(a) from 50 to 96 pbw of a polyetherirnide resin, (b) from 2 to 15 pbw of a first polyester resin comprising recurring structural units, wherein each structural unit comprises a diol residue and a diacid residue and wherein from 90 to 100 mol % of the structural units of the first polyester resin comprise a divalent alicyclic hydrocarbon radical as the diol residue of the structural unit, and (c) from 2 to 48 pbw of a third polyester comprising recurring structural units, wherein each structural unit comprises a diol residue and a diacid residue and wherein from 0 to less than 90 mol % of the structural units of the third polyester resin comprise a divalent alicyclic hydrocarbon radical as the a diol residue of the structural unit, and provided that, if the third polyester comprises structural units wherein the diol residue is a dimethylene radical, then the third polyester does not comprise any structural units wherein the diacid residue is a 2,6-naphthalene dicarboxylate radical.

The thermoplastic resin composition of the present invention exhibits resistance to elevated temperature, visual clarity and improved impact strength.

DETAILED DESCRIPTION OF THE INVENTION

In a preferred embodiment, the thermoplastic resin composition of the present invention comprises, based on 100 pbw of the thermoplastic resin composition, a mixture of (a) from 60 to 90 pbw, more preferably from 75 to 90 pbw, of the polyetherimide resin, (b)(i) from 2 to 15 pbw, more preferably from 5 to 12 pbw, of the first polyester resin, if from 90 mol % to 100 mol % of the structural units of the first polyester resin comprise a divalent alicyclic hydrocarbon radical as the diol residue of the structural unit or (b)(ii) from 5 to 25 pbw, more preferably from 5 to 20 pbw, of the first polyester resin, if from 50 mol % to less than 90 mol % of the structural units of the first polyester comprise a divalent alicyclic hydrocarbon radical as the diol residue of the structural unit, and (c) from 2 to 35 pbw, more preferably from 2 to 20 pbw, of the second polyester resin.

In an alternative preferred embodiment, the a thermoplastic resin composition of the present invention comprises, based on 100 pbw of the thermoplastic resin composition, a mixture of from 60 to 90 pbw of the polyetherimide resin, from 5 to 12 pbw of the first polyester resin and from 2 to 35 pbw of the third polyester resin.

In a preferred embodiment, the thermoplastic resin composition of the present invention the first and second polyester resins are present in a weight first polyester resin: weight second polyester resin ratio of from 0.5:1 to 1:4, more preferably from 1:1 to 1:3, and still more preferably from 1:1 to 1:2.

In an alternative preferred embodiment, the thermoplastic resin composition of the present invention the first and third polyester resins are present in a weight first polyester resin: weight third polyester resin ratio of from 1:1 to 1:3, more preferably from 1:1 to 1:2.

Polyetherimide Resins

The polyetherimide resins of the composition of the present invention are known compounds whose preparation and properties are described in U.S. Pat. Nos. 3,803,085 and 3,905,942, each of which is incorporated herein by reference.

The PEI used for preparing the blends of this invention comprise more than 1, typically from 10 to 1000 or more, and preferably from about 10 to about 500 structural units, of the formula (I):

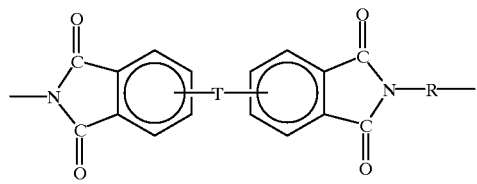

(I)

wherein T is —O— or a group of the formula —O-Z-O— wherein the divalent bonds of the —O— or the —O--Z-O— group are in the 3,3', 3,4', 4,3', or the 4,4' positions; Z is a divalent radical selected from the group consisting of formulae (II):

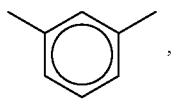

(II)

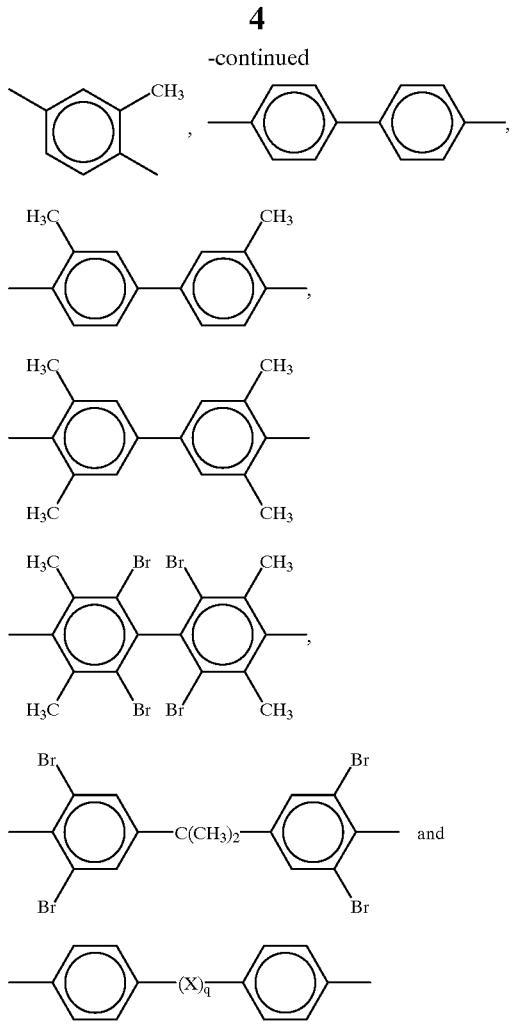

wherein X is a member selected from the group consisting of divalent radicals of the formulae (III):

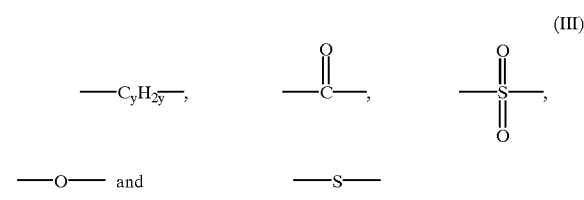

(III)

wherein y is an integer from 1 to about 5, and q is 0 or 1; R is a divalent organic radical selected from the group consisting of: (a) aromatic hydrocarbon radicals having from 6 to about 20 carbon atoms and halogenated derivatives thereof, (b) alkylene radicals having from 2 to about 20 carbon atoms, (c) cycloalkylene radicals having from 3 to about 20 carbon atoms, and (d) divalent radicals of the general formula (IV):

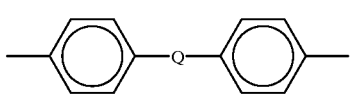

(IV)

where Q is a member selected from the group consisting of formulae (V):

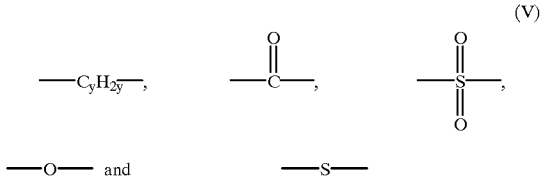

(V)

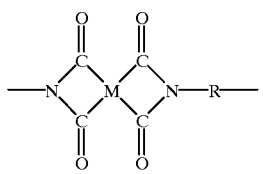

where y is an integer from about 1 to about 5.

In one embodiment, the PEI may be a copolymer which, in addition to the etherimide units described above, further contains polyimide structural units of the formula (VI):

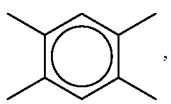

(VI)

wherein R is as previously defined for formula (I) and M is selected from the group consisting of formula (VII):

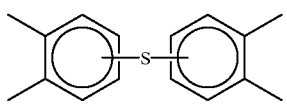

(VII)

formula (VIII):

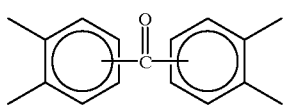

(VIII)

and formula (IX):

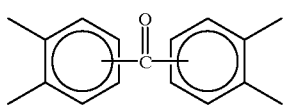

(IX)

The PEI can be prepared by any of the methods well known to those skilled in the art, including the reaction of an aromatic bis(ether anhydride) of the formula (X):

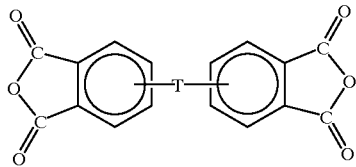

(X)

with an organic diamine of the formula (XI):

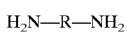   (XI)

wherein T and R are defined as described above in formula (I). In general the reactions can be carried out employing well-known solvents, e.g., o-dichlorobenzene, m-cresol/toluene and the like to effect interaction between the anhydride of formula (X) and the diamine of formula (XI), at temperatures from about 100° C. to about 250° C. Alternatively, the PEI can be prepared by melt polymerization of aromatic bis(ether anhydride)s and diamines accomplished by heating a mixture of the ingredients at elevated temperatures with concurrent stirring. Generally melt polymerizations employ temperatures between about 200° C. and 400° C. Chain stoppers and branching agents may also be employed in the reaction. The PEI and their preparation are described in U.S. Pat. No. 3,983,093, which is incorporated herein by reference.

Examples of specific aromatic bis(ether anhydrides) and organic diamines are disclosed, for example, in U.S. Pat. Nos. 3,972,902 and 4,455,410, which are incorporated by reference herein.

Illustrative examples of aromatic bis(ether anhydride)s of formula (X) include: 2,2-bis[4-(3,4-dicarboxyphenoxy) phenyl]propane dianhydride; 4,4'bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy) benzophenone dianhydride and 4-(2,3-dicarboxyphenoxy)-4'-(3,4-dicarboxyphenoxy)diphenyl sulfone dianhydride, as well as various mixtures thereof.

A preferred class of aromatic bis(ether anhydride)s included by formula (X) above includes compounds wherein T is of the formula (XII):

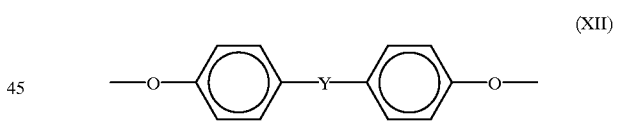

(XII)

and the ether linkages are in the 3,3', 3,4', 4,3', or the 4,4' positions, and mixtures thereof, and where Y is selected from the group consisting of formulae (XIII):

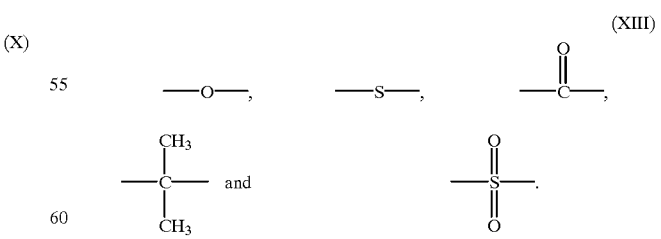

(XIII)

When PEI/polyimide copolymers are employed, a dianhydride, such as pyromellitic anhydride, is used in combination with the bis(ether anhydride).

The bis(ether anhydride)s can be prepared by the hydrolysis, followed by dehydration, of the reaction product of a nitro substituted phenyl dinitrile with a metal salt of dihydric phenol compound in the presence of a dipolar, aprotic solvent.

Suitable organic diamines of formula (XI) include, for example: m-phenylenediamine; p-phenylenediamine; 4,4'-diaminodiphenylpropane, 4,4'-diaminodiphenylmethane (commonly named 4,4'-methylenedianiline); 4,4'-diaminodiphenyl sulfide; 4,4'-diaminodiphenyl sulfone; 4,4'-diaminodiphenyl ether (commonly named 4,4'-oxydianiline); 1,5-diaminonaphthalene; 3,3-dimethylbenzidine; 3,3-dimethoxybenzidine; 2,4-bis(beta-amino-t-butyl)toluene; bis(p-beta-amino-t-butylphenyl) ether; bis(p-beta-methyl-o-aminophenyl)benzene; 1,3-diamino-4-isopropylbenzene; 1,2-bis(3-aminopropoxy) ethane; benzidine; m-xylylenediamine; 2,4-diaminotoluene; 2,6-diaminotoluene; bis(4-aminocyclohexyl)methane; 3-methylheptamethylenediamine; 4,4-dimethylheptamethylenediamine; 2,11-dodecanediamine; 2,2-dimethylpropylenediamine; 1,18-octamethylenediamine; 3-methoxyhexamethylenediamine; 2,5-dimethylhexamethylenediamine; 2,5-dimethylheptamethylenediamine; 3-methylheptamethylenediamine; 5-methylnonamethylenediamine; 1-4-cyclohexanediamine; 1,18-octadecanediamine; bis(3-aminopropyl)sulfide; N-methyl-bis(3-aminopropyl)amine; hexamethylenediamine; heptamethylenediamine; nonamethylenediamine; decamethylenediamine and mixtures of such diamines.

Generally, useful PEI have a melt index of between 0.5 and 2.5 grams per minute ("g/min"), as measured by ASTMD 1238 at 337° C., using a 6.6 kilogram weight.

In a preferred embodiment, the polyetherimide resin of the present invention resin has a weight average molecular weight of from 10,000 to 150,000, as measured by gel permeation chromatography, using a polystyrene standard.

Included among the many methods of making the PEI are those disclosed in U.S. Pat. Nos. 3,847,867, 3,814,869, 3,850,885, 3,852,242 and 3,855,178. These disclosures are incorporated herein in their entirety by reference for the purpose of teaching, by way of illustration, general and specific methods for preparing PEI for use in the blends of this invention.

In a preferred embodiment, the polyetherimide resin comprises structural units according to formula (I) wherein each R is independently paraphenylene or metaphenylene and T is a divalent radical of the formula (XIV):

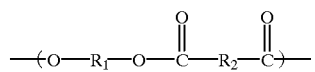

(XIV)

Polyester Resins

The first, second and third polyester resins of composition of the present invention are each typically obtained through the condensation or ester interchange polymerization of a diol or diol equivalent with a diacid or diacid equivalent and each comprise recurring structural units according to formula (XV):

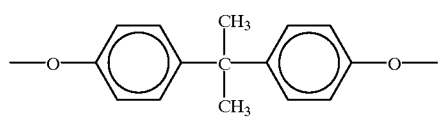

(XV)

wherein:
$R_1$ represents the residue of the diol or diol equivalent ("diol residue"), $R_2$ represents the residue of the diacid or diacid equivalent ("diacid residue"), and
each $R_1$ and $R2$ is independently a divalent acyclic hydrocarbon radical, a divalent alicyclic hydrocarbon radical or a divalent aromatic hydrocarbon radical.

As used herein, the terminology "acyclic hydrocarbon radical" means a straight chain or branched saturated hydrocarbon radical, preferably containing from 2 to 12 carbon atoms per radical, such as, for example, dimethylene, trimethylene, tetramethylene, hexamethylene and octamethylene.

As used herein, the terminology "alicyclic hydrocarbon radical" means a hydrocarbon radical containing one or more saturated hydrocarbon rings, preferably containing from 4 to 10 carbon atoms per ring, per radical which may optionally be substituted on one or more of the rings with one or more alkyl or alkylene groups, each preferably containing from 2 to 6 carbon atoms per group and which, in the case of two or more rings, may be fused rings, such as, for example, 2,2,4,4-tetramethyl-1,3-cyclobutylene, 1,4-cyclohexylene, cyclohexylene-1,4-dimethylene, 1,4-cyclooctylene.

As used herein, the term "aromatic hydrocarbon radical" means a hydrocarbon radical containing one or more aromatic rings per radical, which may optionally be substituted on the one or more aromatic rings with one or more alkyl or alkylene groups, each preferably containing from 2 to 6 carbon atoms per group and which, in the case of two or more rings, may be fused rings, such as, for example, 1,2-phenylene, 1,3-phenylene, 1,4-phenylene, 2,6-naphthalene, 2,7-phenathrylene.

Suitable diols include acyclic diols such as, for example, ethylene glycol, 1,3-propylene glycol, 1,4-butane glycol, 1,5-pentane diol, 1,6-hexane diol, 1,7-heptane diol, 1,8-octane diol, 1,9-nonane diol, 1,10-decane diol, 1,12-dodecane diol; alicyclic diols such as, for example, 2,2,4,4-tetramethyl-1,3cyclobutane diol, 3,4-cyclopentanediol, 1,4-cyclohexanedimethanol, including cis-1,4-cyclohexanedimethanol and trans-1,4-cyclohexanedimethanol; and aromatic diols such as, for example, bisphenol A and hydroquinone. Suitable diol equivalents include corresponding esters and ethers, such as for example, dialkyl esters and diaryl esters.

Suitable diacids include, for example, dicarboxylic acids, such as, for example, phthalic acid, isophthalic acid, terephthalic acid, dimethyl terephthalic acid, oxalic acid, malonic acid, succinic acid, glutaric acid, adipic acid, pimelic acid, suberic acid, azelaic acid, sebacic acid, dimethyl malonic acid, 1,12-dodecanoic acid cis-1,4-cyclohexane dicarboxylic acid, trans-1,4cyclohexane dicarboxylic acid, 4,4'- bisbenzoic acid, naphthalene-2,6-dicarboxylic acid. Suitable diacid equivalents include, for example, corresponding anhydride, ester or halide derivatives, such as, for example, phthalic anhydride, dimethyl terephthalate, succinyl chloride.

In a preferred embodiment, the first and second polyester resins each have a number average molecular weight of from 10,000 to 100,000, more preferably 15,000 to 50,000, as measured by gel permeation chromatography using a polystyrene standard.

Methods for making polyester resins are well know in the art, see for example, Kirk-Othmer Encyclopedia of Chemical Technology, Fourth Edition, Vol. 19 at pp. 609–653, John Wiley & Sons (1996).

First Polyester Resin

In a preferred embodiment, from 90 to 100 mol %, more preferably about 100 mol %, and most preferably 100 mol %, of the structural units of the first polyester resin comprise a divalent alicyclic hydrocarbon radical, most preferably a cyclohexane-1,4-dimethylene radical, as the diol residue of the structural unit and any remaining structural units of the first polyester resin preferably comprise a divalent acyclic hydrocarbon radical, most preferably a dimethylene radical, as the diol residue of the structural unit.

In an alternative preferred embodiment, from 50 to less than 90 mol %, more preferably from 60 to 85 mol % of the structural units of the first polyester resin comprise a divalent alicyclic hydrocarbon radical, most preferably a cyclohexane-1,4-dimethylene radical, as the diol residue of the structural unit and the remaining structural units of the first polyester resin preferably comprise a divalent acyclic hydrocarbon radical, most preferably a dimethylene radical, as the diol residue of the structural unit.

In a preferred embodiment, the first polyester resin comprises structural units wherein a divalent aromatic hydrocarbon radical, preferably a 1,4-phenylene radical or 1,3-phenylene radical, most preferably a 1,4-phenylene radical, is the diol residue of the structural unit. In a highly preferred embodiment, each of the structural units of the first polyester resin comprise a divalent aromatic hydrocarbon radical, each independently a 1,4-phenylene radical or a 1,3-phenylene radical, most preferably a 1,4-phenylene radical, as the diacid residue of the structural unit.

In a highly preferred embodiment, the first polyester resin is a poly(cyclohexane-1,4-dimethylene terephthalate) resin. Suitable polyester resins are made, for example, by the polymerization of 1,4-cyclohexanedimethanol with terephthalic acid.

Second Polyester Resin

In a first preferred embodiment, from 10 to less than 50 mol %, still more preferably from 20 to 40 mol %, of structural units of the second polyester resin comprise a divalent alicyclic hydrocarbon radical, most preferably a cyclohexane-1,4-dimethylene radical, as the diol residue of the structural unit and from 50 to 90 mol %, more preferably from 60 to 80 mol %, of the structural units of the second polyester resin comprise a divalent acyclic hydrocarbon radical, most preferably a dimethylene radical, as the diol residue of the structural unit.

In a second preferred embodiment, 100 mol % the structural units of the second polyester resin comprise a divalent acyclic hydrocarbon radical, most preferably a dimethylene radical, as the diol residue of the structural unit.

In a preferred embodiment, the second polyester resin comprises structural units wherein a divalent aromatic hydrocarbon radical, preferably a 1,4-phenylene radical or 1,3-phenylene radical, most preferably a 1,4phenylene radical, is the diol residue of the structural unit. In a highly preferred embodiment, each of the structural units of the second polyester resin comprise a divalent aromatic hydrocarbon radical, each independently a 1,4-phenylene radical or a 1,3-phenylene radical, most preferably a 1,4phenylene radical, as the diacid residue of the structural unit.

In a first highly preferred embodiment, the second polyester resin is a poly(ethylene-co-cyclohexane-1,4-dimethylene terephthalate) copolymer. Suitable polyester resins are made, for example, by the polymerization of ethylene glycol and 1,4-cyclohexanedimethanol with terephthalic acid.

In a second highly preferred embodiment, the second polyester resin is a poly(ethylene terephthalate) resin. Suitable polyester resins are made, for example, by the polymerization of ethylene glycol with terephthalic acid.

Third Polyester Resin

In a first preferred embodiment, from 50 to less than 90 mol % of structural units of the third polyester resin comprise a divalent alicyclic hydrocarbon radical, most preferably a cyclohexane-1,4-dimethylene radical, as the diol residue of the structural unit and from 10 to 50 mol % of the structural units of the third polyester resin comprise a divalent acyclic hydrocarbon radical, most preferably a dimethylene radical, as the diol residue of the structural unit. In a highly preferred embodiment, the third polyester resin is a poly(cyclohexane-1,4-dimethylene-co-dimethylene terephthalate) copolymer. Suitable polyester resins are made, for example, by the polymerization of 1,4-cyclohexanedimethanol and ethylene glycol with terephthalic acid.

In a second preferred embodiment, from 10 to less than 50 mol % of structural units of the third polyester resin comprise a divalent alicyclic hydrocarbon radical, most preferably a cyclohexane-1,4-dimethylene radical, as the diol residue of the structural unit and from 50 to 90 mol % of the structural units of the third polyester resin comprise a divalent acyclic hydrocarbon radical, most preferably a dimethylene radical, as the diol residue of the structural unit. In a highly preferred embodiment, the third polyester resin is a poly(ethylene-co-cyclohexane-1,4-dimethylene terephthalate) copolymer. Suitable polyester resins are made, for example, by the polymerization of ethylene glycol and 1,4-cyclohexanedimethanol with terephthalic acid.

In a third preferred embodiment, 100 mol % the structural units of the third polyester resin comprise a divalent acyclic hydrocarbon radical, most preferably a dimethylene radical, as the diol residue of the structural unit. In a highly preferred embodiment, the third polyester resin is a poly(ethylene terephthalate) resin. Suitable polyester resins are made, for example, by the polymerization of ethylene glycol with terephthalic acid.

In a preferred embodiment, the third polyester resin comprises structural units wherein a divalent aromatic hydrocarbon radical, preferably a 1,4-phenylene radical or 1,3-phenylene radical, most preferably a 1,4-phenylene radical, is the diol residue of the structural unit. In a highly preferred embodiment, each of the structural units of the third polyester resin comprise a divalent aromatic hydrocarbon radical, each independently a 1,4-phenylene radical or a 1,3-phenylene radical, radical, most preferably a 1,4-phenylene radical, as the diacid residue of the structural unit.

Other Additives

The thermoplastic resin composition of the present invention may optionally also contain various conventional additives, such as antioxidants, such as, for example, organophosphites, for example, tris(nonylphenyl)phosphite, tris(2,4-di-t-butylphenyl)phosphite, bis(2,4-di-t-butylphenyl)pentaerythritol diphosphite or distearyl pentaerythritol diphosphite, alkylated monophenols, polyphenols and alkylated reaction products of polyphenols with dienes, such as, for example, tetracis(methylene)-3,5-di-t-butyl-4-hydroxycinnamate, butylated reaction products of para-cresol and dicyclopentadiene, alkylated hydroquinones, hydroxylated thiodiphenyl ethers, alkylidene-bisphenols, benzyl compounds, acylaminophenols, esters of beta-(3,5-di-tert-butyl-4- hydroxyphenol)propionic acid with monohydric or polyhydric alcohols, esters of beta-(5-tertbutyl-4-hydroxy-3-methylphenyl)-propionic acid with monohydric or polyhydric alcohols, esters of beta-(5-tert-butyl-4-hydroxy-3-methylphenyl) propionic acid with mono-or polyhydric alcohols, esters of thioalkyl or thioaryl compounds, such as, for example, distearylthiopropionate, dilaurylthiopropionate, ditridecylthiodipropionate, amides of beta-(3,5-di-tert-butyl-4-hydroxyphenol)-propionic acid; fillers and reinforcing agents, such as, for example, silicates, $TiO_2$, glass fibers, carbon black, graphite, calcium carbonate, talc, mica and other additives such as, for example, UV absorbers, light stabilizers, lubricants, plasticizers, pigments, dyes, colorants, anti-static agents, blowing agents.

The preparation of the compositions of the present invention is normally achieved by merely blending the ingredients under conditions for the formation of an intimate blend. Such conditions often include solution blending or melt mixing in single or twin screw type extruders, mixing bowl, or similar mixing devices which can apply a shear to the components. Twin screw extruders are often preferred due to their more intensive mixing capability over single screw extruders. It is often advantageous to apply a vacuum to the melt through at least one vent port in the extruder to remove volatile impurities in the composition.

The composition of the present invention can be molded into useful articles, such as, for example, heat resistant containers, by a variety of means such as, for example, injection molding and extrusion.

Comparative Examples C1–C4 and Examples 1–11

The thermoplastic resin compositions of Comparative Examples C1–C4 and Examples 1–11 were made by combining the components described below in the relative amounts (each expressed in percent by weight, based on the total weight of the respective thermoplastic resin composition) set forth in TABLES I–III. The components used in the thermoplastic resin compositions were as follows:

| | |
|---|---|
| PEI-1 | Polyetherimide resin made by condensation of 2,2-bis[4-(3,4-dicarboxyphenoxy)phenyl] propane dianhydride with metaphenylene diamine and having a melt index of 0.9 g/min, |
| PEI-2 | Polyetherimide resin made by condensation of a 2,2-bis[4-(3,4-dicarboxyphenoxy)phenyl] propane dianhydride with metaphenylene diamine and having a melt index of 1.8 g/min, |
| PET | Poly(ethylene terephthalate) resin having an intrinsic viscosity of 0.820 (Laser ™ B-95A resin, ICI), |
| PCT | Poly(cyclohexanedimethanol terephthalate) resin having a nominal inherent viscosity of 0.77, (Ektar ™ PCT 13787 resin, Eastman Chemical Company) and |
| PETG | Poly(ethylene-co-cyclohexane-1,4-dimethylene terephthalate) resin having a nominal inherent viscosity of 0.75, (Eastar ™ PETG Copolyester 6763 resin, Eastman Chemical Company). |

Test specimens of the compositions of comparative examples C1–C4 and examples 1–11 were molded and subjected to the following measurements. The test specimens were visually examined and qualitatively rated with respect to visual clarity. Heat distortion temperature was measured at 264 pounds per square inch ("psi") on unannealed 0.25 inch thick test specimens according to ASTM D648. Yellowness Index was measured according to ASTM D1925 on 0.125 thick test specimens. Tensile strength at yield, tensile strength at break, tensile elongation and tensile modulus were measured according to ASTM 638 using 0.125 inch thick test specimens. Flexural modulus and flexural strength were measured according to ASTM D790 using a 6 inch×0.5 inch×0.25 inch test specimens. Reverse notched Izod impact strength was measured at 73° F. according to ASTM D256 using 2.5 inch×0.5 inch×0.125 inch test specimens. Dart impact strength according to ASTM D3763 at 73° F. using 4 inch diameter×0.125 inch thick test specimens. The melt index ("MI") of each of the sample compositions was measured according to ASTM D1238 at 295° C., using a 6.6 kg weight.

Results of the testing are set forth below for each of the comparative examples C1–C4 and examples 1–11 in TABLES I-III as follows: visual clarity rating, expressed as clear ("CLR"), translucent ("TL") or opaque ("OP"), heat distortion temperature, expressed in degrees centigrade ("HDT, ° C."), yellowness index ("YI"), tensile strength at yield, tensile strength at break and tensile modulus, each expressed in kilo-pounds per square inch ("kpsi"), tensile elongation expressed as a percentage of original specimen length ("%"), flexural strength and flexural modulus, each expressed in kpsi, notched Izod impact and reverse notched Izod impact, each expressed in foot-pounds per inch ("ft-lb/in"), specific gravity and dart impact, expressed in foot-pounds ("ft-lb") and melt index at 295° C., expressed in grams per minute ("g/min").

TABLE I

| | C1 | C2 | C3 | C4 |
|---|---|---|---|---|
| PEI-1 | 85 | 80 | 85 | 79.8 |
| PCT | 15 | 20 | — | — |
| PETG | — | — | 15 | 20 |
| Additives | — | — | — | 0.2 |
| Visual Clarity | TL | OP | CLR | CLR |
| HDT (° C.) | 178 | 175 | 172 | 166 |
| YI | 83 | — | 68 | 69 |
| Tensile strength at yield (kpsi) | — | — | 15.9 | 14.9 |
| Tensile strength at break (kpsi) | 13.6 | 11.0 | 12.4 | 10.5 |
| Tensile Elongation (%) | 4.0 | 3.2 | 32 | 23 |
| Tensile Modulus (kpsi) | 484 | 420 | 468 | 486 |
| Flexural Strength (kpsi) | 21.9 | 21.0 | 23.2 | 22.2 |
| Flexural Modulus (kpsi) | 473 | 466 | 502 | 485 |
| Reverse Notched Izod Impact Strength (kpsi) | 16.2 | 39.9 | 20.8 | 20.5 |
| Dart Impact (ft-lb) | 5.7 | 0.91 | 6.6 | 6.6 |
| Melt Index (g/min) | 0.54 | 0.46 | 0.44 | 0.52 |

TABLE II

| | 1 | 2 | 3 | 4 | 5 | 6 |
|---|---|---|---|---|---|---|
| PEI-1 | 85 | 85 | 80 | 80 | 80 | 79.8 |
| PCT | 5 | 10 | 10 | 8 | 5 | 8 |
| PETG | 10 | 5 | 10 | 12 | 15 | 12 |
| Additives | — | — | — | — | — | 0.2 |
| Visual Clarity | CLR | CLR | CLR | CLR | CLR | CLR |
| HDT (° C.) | 164 | 176 | 166 | 164 | 162 | 166 |

TABLE II-continued

|  | 1 | 2 | 3 | 4 | 5 | 6 |
|---|---|---|---|---|---|---|
| YI | 71 | 67 | 71 | 71 | 69 | 69 |
| Tensile strength at yield (kpsi) | 15.8 | 15.3 | 14.9 | 14.9 | 15.3 | — |
| Tensile strength at break (kpsi) | 12.3 | 12.7 | 12.4 | 13.2 | 12.4 | 13.1 |
| Tensile Elongation (%) | 22 | 13 | 14 | 93 | 19 | 4.1 |
| Tensile Modulus (kpsi) | 451 | 443 | 467 | 481 | 472 | 566 |
| Flexural Strength (kpsi) | 22.5 | 22.4 | 22.2 | 22.3 | 21.2 | 22.4 |
| Flexural Modulus (kpsi) | 488 | 488 | 496 | 473 | 481 | 477 |
| Reverse Notched Izod Impact Strength (kpsi) | 21.8 | 22.3 | 24.6 | 27.7 | 28.0 | 23.7 |
| Dart Impact (ft-lb) | 10.5 | 15.2 | 15.7 | 22.6 | 15.0 | 12.0 |
| Melt Index (g/min) | 0.34 | 0.36 | 0.63 | 0.79 | 0.68 | 0.66 |

The compositions of examples 1–6 of the present invention exhibit improved visual clarity compared to the compositions of Comparative Examples C1 and C2 and exhibit improved impact performance, as compared to the respective analogous compositions of Comparative Examples C1–C4, without a significant drop in HDT value. Note, particularly, the dramatic increase in dart impact performance the compositions of Examples 1–5 over those of the respective analogous Comparative Examples C1–C4. The compositions of Examples 3–6 exhibit improved melt flow, that is increased melt index value, over the compositions of Comparative Examples C1–C4.

TABLE III

|  | 7 | 8 | 9 |
|---|---|---|---|
| PEI-1 | 84.8 | 84.8 | — |
| PEI-2 | — | — | 80 |
| PCT | 7.5 | 10 | 8 |
| PETG | — | — | 12 |
| PET | 7.5 | 5 | — |
| Additives | 0.2 | 0.2 | — |
| Visual Clarity | CLR | CLR | CLR |
| HDT (° C.) | 172 | 172 | 167 |
| YI | 66 | 72 | 76 |
| Tensile strength at yield (kpsi) | 15.7 | 15.4 | 15.0 |
| Tensile strength at break (kpsi) | 11.6 | 12.8 | 11.7 |
| Tensile Elongation (%) | 13 | 36 | 58 |
| Flexural Strength (kpsi) | 23.5 | 28.9 | 21.1 |
| Flexural Modulus (kpsi) | 509 | — | 442 |
| Reverse Notched Izod Impact Strength (kpsi) | 20.4 | 20.9 | >31.4 |
| Dart Impact (ft-lb) | 6.2 | 4.6 | 40 |
| Melt Index (g/min) | 0.38 | 0.45 | 0.76 |

The compositions of Examples 7 and 8 of the present invention exhibit improved visual clarity with comparable HDT values and impact performance, as compared to the composition of comparative example C1.

We claim:

1. A visually clear thermoplastic resin composition, comprising a mixture, based on 100 parts by weight of the thermoplastic resin composition, of:
   (a) from 50 to 96 parts by weight of a polyetherimide resin,
   (b) from 2 to 35 parts by weight of a first polyester resin comprising recurring structural units, wherein each structural unit comprises a diol residue and a diacid residue and wherein from 50 to 100 mole percent of the structural units of the first polyester resin comprise a divalent alicyclic hydrocarbon radical as the diol residue of the structural unit, said first polyester resin being present in an amount of:
      (i) from 2 to 15 parts by weight, if from 90 to 100 mole percent of the structural units of the first polyester resin comprise a divalent alicyclic hydrocarbon radical as the diol residue of the structural unit, or
      (ii) from 2 to 35 parts by weight, if from 50 mole percent to less than 90 mole percent of the structural units of the first polyester resin comprise a divalent alicyclic hydrocarbon radical as the diol residue of the structural unit, and
   (c) from 2 to 48 parts by weight of a second polyester comprising recurring structural units, wherein each structural unit comprises a diol residue and a diacid residue and wherein from 0 to less than 50 mole percent of the structural units of the second polyester resin comprise a divalent alicyclic hydrocarbon radical as the a diol residue of the structural unit, provided that, if the second polyester comprises structural units wherein the diol residue is a dimethylene radical, then the second polyester does not comprise any structural units wherein the diacid residue is a 2,6-naphthalene dicarboxylate radical and further provided that the polyetherimide resin must be present in an amount greater than 65 parts by weight if less than or equal to 60 mole percent of the structural units of the first polyester comprise a divalent alicyclic radical as the a diol residue of the structural unit.

2. The composition of claim 1, wherein the composition comprises from 60 to 90 parts by weight of the polyetherimide resin from 2 to 15 parts by weight of the first polyester resin and from 2 to 35 parts by weight of the second polyester resin.

3. The composition of claim 1, wherein the polyetherimide resin comprises structural units of the formula (I):

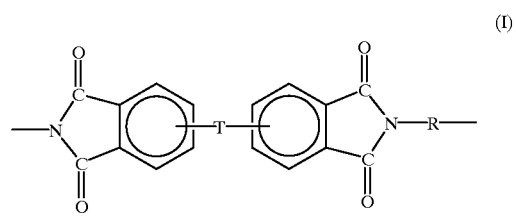

wherein T is —O— or a group of the formula —O-Z-O— wherein the divalent bonds of the —O— or the —O-Z-O— group are in the 3,3', 3,4', 4,3', or the 4,4' positions; Z is a divalent radical selected from the group consisting of formulae (II):

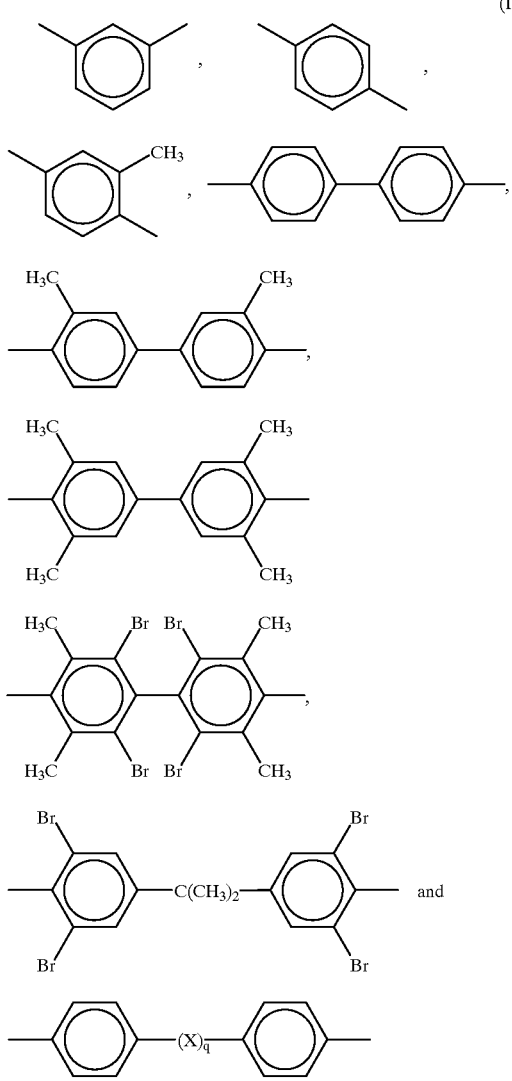

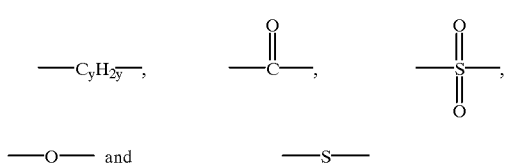

wherein X is a member selected from the group consisting of divalent radicals of the formulae (III):

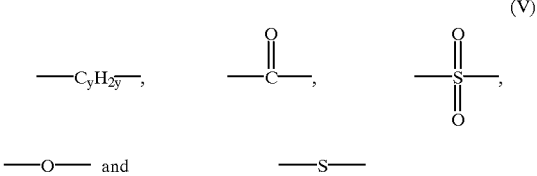

wherein y is an integer from 1 to about 5, and q is 0 or 1; R is a divalent organic radical selected from the group consisting of: (a) aromatic hydrocarbon radicals having from 6 to about 20 carbon atoms and halogenated derivatives thereof, (b) alkylene radicals having from 2 to about 20 carbon atoms, (c) cycloalkylene radicals having from 3 to about 20 carbon atoms, and (d) divalent radicals of the general formula (IV):

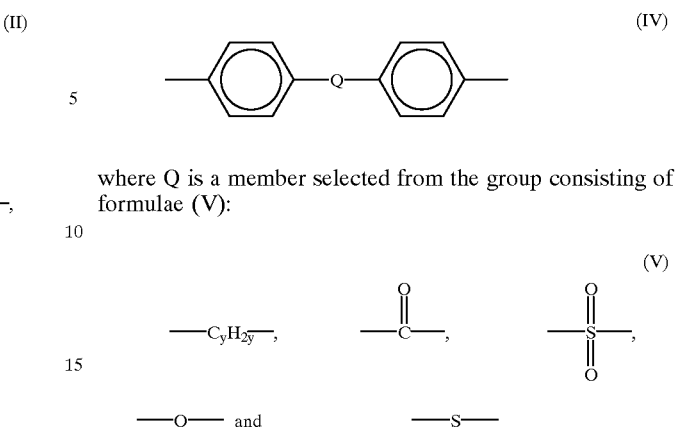

where Q is a member selected from the group consisting of formulae (V):

where y is an integer from about 1 to about 5.

4. The composition of claim 1, wherein the polyetherimide resin is the reaction product former by melt polymerization of 2,2-bis[4-(3,4-dicarboxyphenoxy)phenyl]propane dianhydride with metaphenylene diamine.

5. The composition of claim 1, wherein the composition comprises from 2 to 15 parts by weight of the first polyester resin and from 90 mole percent to 100 mole percent of the structural units of the first polyester resin comprise a divalent alicyclic hydrocarbon radical as the a diol residue of the structural unit.

6. The composition of claim 1, wherein the structural units of the first polyester resin each comprise a 1,4-phenylene or 1,3-phenylene radical as the diacid residue of the structural unit.

7. The composition of claim 1, wherein 100 mole percent of the structural units of the first polyester resin comprise a cyclohexane-1,4-dimethylene radical as the diol residue of the structural unit.

8. The composition of claim 1, wherein the first polyester resin is a poly(cyclohexane-1,4-dimethylene terephthalate) resin.

9. The composition of claim 1, wherein from more than 50 mole percent to 90 mole percent of the structural units of the second polyester resin comprise a dimethylene radical as the diol residue of the structural unit and from 10 mole percent to less than 50 mole percent mole percent of the structural units of the second polyester resin comprise a cyclohexane-1,4-dimethylen radical as the diol residue of the structural unit.

10. The composition of claim 1, wherein 100 mole percent of the structural units of the second polyester resin comprise a dimethylene radical as the diol residue of the structural unit.

11. The composition of claim 1, wherein the structural units of the second polyester resin each comprise a 1,4-phenylene or 1,3-phenylene radical as the diacid residue of the structural unit.

12. The composition of claim 1, wherein the second polyester resin is a poly(ethylene-co-cyclohexane-1,4-dimethylene terephthalate) resin.

13. The composition of claim 1, wherein the second polyester resin is a poly(ethylene terephthalate) resin.

14. The composition of claim 1, wherein the composition is in particulate form.

15. A thermoplastic article made by molding the composition of claim 1.

16. A visually clear thermoplastic resin composition, comprising a mixture, based on 100 parts by weight of the thermoplastic resin composition, of:

(a) from 50 to 96 parts by weight of a polyetherimide resin,
(b) from 2 to 15 parts by weight of a first polyester resin comprising recurring structural units, wherein each structural unit comprises a diol residue and a diacid residue and wherein from 90 to 100 mole percent of the structural units of the first polyester resin comprise a divalent alicyclic hydrocarbon radical as the diol residue of the structural unit, and
(c) from 2 to 48 parts by weight of a third polyester comprising recurring structural units, wherein each structural unit comprises a diol residue and a diacid residue and wherein from 0 mole percent to less than 90 mole percent of the structural units of the third polyester resin comprise a divalent alicyclic hydrocarbon radical as the a diol residue of the structural unit, and provided that, if the third polyester comprises structural units wherein the diol residue is a dimethylene radical, then the third polyester does not comprise any structural units wherein the diacid residue is a 2,6-naphthalene dicarboxylate radical.

* * * * *